United States Patent
Hilgert

[11] Patent Number: 6,158,472
[45] Date of Patent: Dec. 12, 2000

[54] APPARATUS FOR DAMPING A PULSATION OF A FLUID CONVEYED THROUGH A CONVEYING DEVICE

[75] Inventor: Andreas Hilgert, Sinzheim, Germany

[73] Assignee: Aeroquip-Vickers International GmbH, Baden-Baden, Germany

[21] Appl. No.: 09/421,736

[22] Filed: Oct. 20, 1999

[30] Foreign Application Priority Data

Oct. 21, 1998 [DE] Germany ............... 198 48 379

[51] Int. Cl.$^7$ .................................. F16L 55/04
[52] U.S. Cl. ..................... 138/26; 138/30; 181/269; 220/720
[58] Field of Search .............. 138/30, 26; 181/238, 181/256, 257, 275, 281, 269; 220/720

[56] References Cited

U.S. PATENT DOCUMENTS

| | | | |
|---|---|---|---|
| 2,993,559 | 7/1961 | Everett | 181/53 |
| 5,495,711 | 3/1996 | Kalkman et al. | 138/111 X |
| 5,785,089 | 7/1998 | Kuykendal et al. | 138/42 |
| 5,983,946 | 11/1999 | Chen et al. | 138/30 |
| 6,073,656 | 6/2000 | Chen et al. | 138/26 |

FOREIGN PATENT DOCUMENTS

| | | |
|---|---|---|
| 1170212 | 11/1956 | France . |
| 1536140 | 9/1967 | France . |
| 318869 | 6/1919 | Germany . |
| 298151 | 2/1992 | Germany . |

*Primary Examiner*—Patrick Brinson
*Attorney, Agent, or Firm*—Emch, Schaffer, Schaub & Porcello, Co., L.P.A.

[57] ABSTRACT

Apparatus damps pulsations of a fluid conveyed through a conveying device. The fluid is led by way of a first tubular element into a cavity formed by a flexible element and emerges from the cavity by way of a second tubular element. The tubular elements are arranged within the cavity in the flexible element. The length of each of the individual tubular elements is less than the length of the cavity; however, the sum of the lengths of the tubular elements is greater than the length of the cavity.

18 Claims, 1 Drawing Sheet

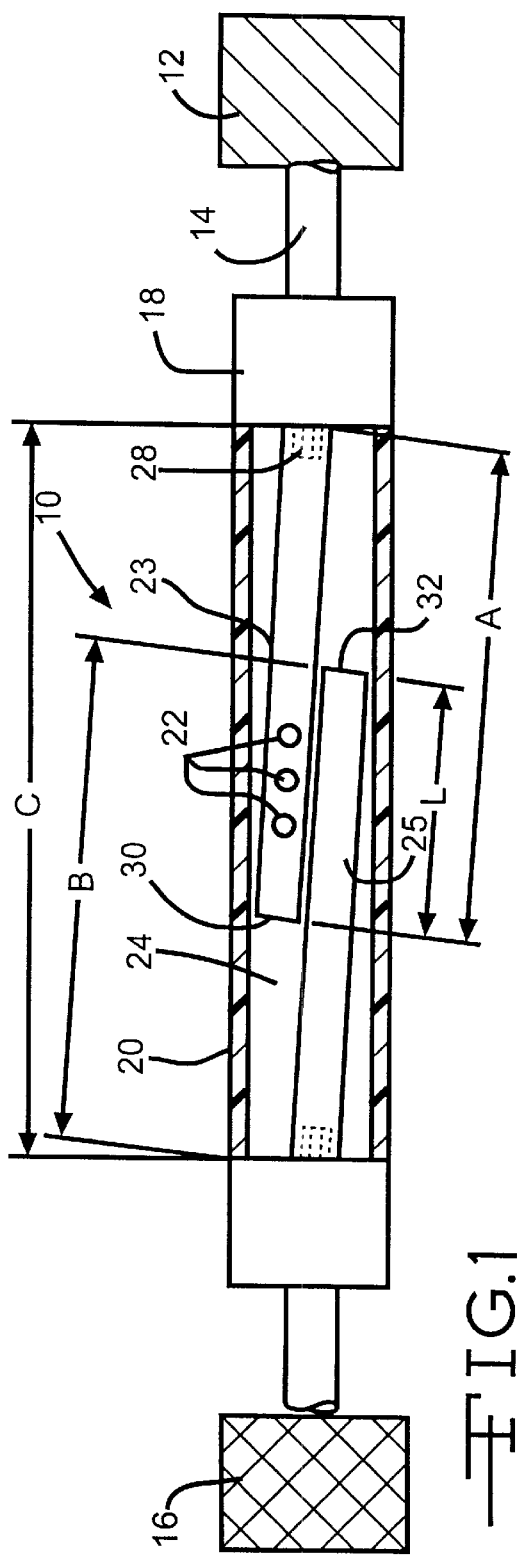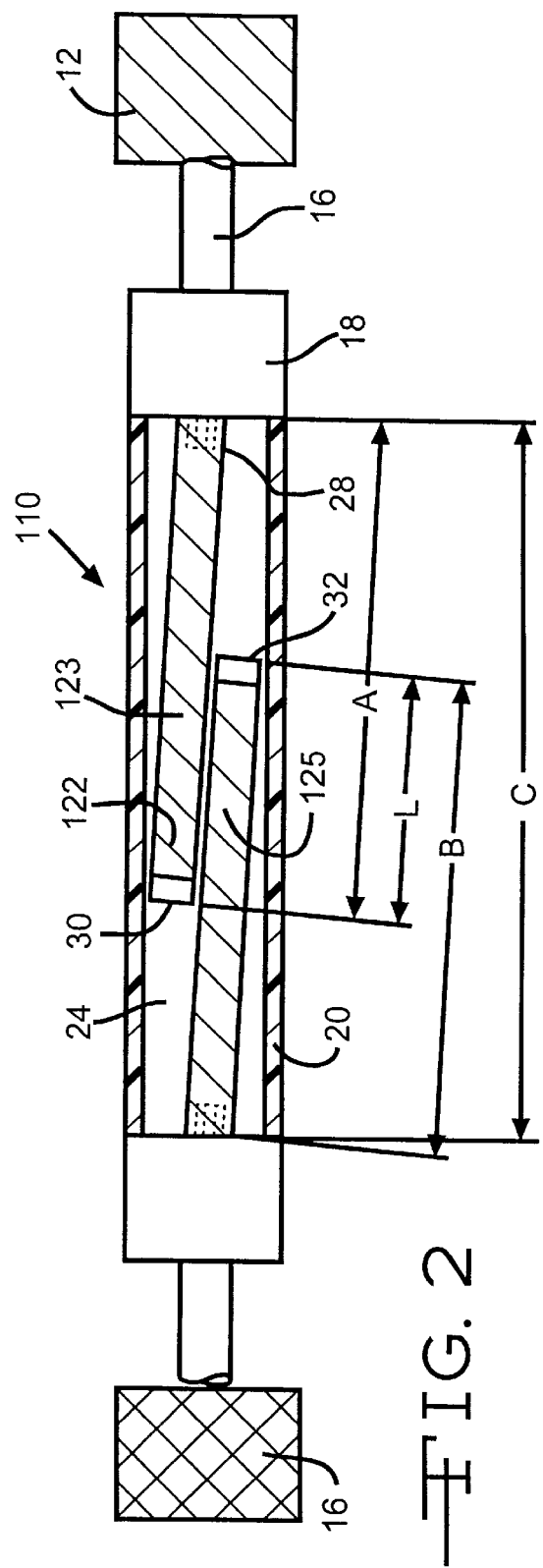

APPARATUS FOR DAMPING A PULSATION OF A FLUID CONVEYED THROUGH A CONVEYING DEVICE

BACKGROUND OF THE INVENTION

This invention relates to a apparatus for damping a pulsation of a fluid conveyed through a conveying device. The apparatus is particularly directed to a device in which fluid flows through a first tubular element into a cavity formed by a flexible element and emerges from the cavity by way of a second tubular element. The first and second tubular elements have a size and are arranged within the cavity of the flexible element such that the length of the individual tubular elements is smaller than the length of the cavity of the flexible element; however the sum of the lengths of the tubular elements is greater than the length of the cavity.

It is known to use conveying devices for conveying a fluid, for example a cooling or hydraulic unit. In this case, the fluid is conveyed from a suction side to a delivery side of the conveying device, at the same time with an increase in pressure, by means of a displacement unit. An appropriate conduit is connected to a delivery connection of the conveying device in order to transfer the conveyed fluid. The displacement unit normally possesses a plurality of displacement chambers, the conveyed part-volumes of which are combined to form a total volume flow of the conveying device. This causes the volume flow to pulsate. The temporary rise and fall in the pressure (pulsation) may be divided into individual pressure waves. Pulsations of this kind also occur when gaseous fluids are conveyed.

The pulsation of the fluid gives rise, on the one hand, to vibrations and, on the other hand, to disturbing noises.

In order to avoid these disadvantages, in the arrangements known hitherto the fluid has been led through tubular elements which are arranged in the fluid stream. It is also known to arrange the tubular elements in a cavity which is formed by a flexible element and through which the fluid flows. In this case, a first tubular element is used as an inflow and a second tubular element as an outflow. The two tubular elements are, in this case, arranged in such a way that their inflow and outflow orifices are located opposite one another and are arranged at a distance from one another. There is also a gap between the inflow and outflow orifices.

The cavity formed or enclosed by the flexible element is likewise filled with the fluid, and the fluid conveyed by the hydraulic conveying device flows from the inflow orifice of the first tubular element by way of the gap to the outflow orifice of the second tubular element. In this case, in the region of the gap, the fluid is damped as a result of interaction with the fluid located in the cavity. At the same time, on the one hand, the front of the pressure wave is widened due to turbulences which occur and, on the other hand, a cavity formed by the flexible element increases in size by virtue of the internal pressure which has risen. As soon as the internal pressure falls again, contraction of a flexible element occurs, this force likewise serving for conveying the fluid. In the arrangement known hitherto, however, pulsations continue to occur. Pulsation damping for this type of prior device is therefore insufficient.

The object on which the invention is based is to allow greater damping of the pulsation in a cost-effective way without any additional outlay in design terms.

To achieve this object, it is proposed to have a flexible element enclosing a cavity and to have two tubular elements positioned in the cavity of the flexible element. Under the present invention, the length of the individual tubular elements is less than the length of the cavity of the flexible element; however, the sum of the lengths of the tubular elements is greater than the length of the cavity. In this way, on the one hand, the distance from the inflow orifice to the outflow orifice is increased; on the other hand, the direction of flow of the fluid is reversed in the region between the inflow orifice and the outflow orifice. This results in advantageous pulsation damping.

The tubular elements consist, for example, of plastic or of metal, preferably of high-grade steel. Their composition may be adapted to the fluid to be conveyed and to the pulsations which occur. The flexible element is integrated via a sleeve, flange or the like into the circuit of the fluid to be conveyed. The said flexible element has a flexible wall which may consist, for example, of an elastomer.

Further preferred embodiments of the invention may be gathered from the remaining features which are mentioned in the subclaims.

BRIEF DESCRIPTION OF THE DRAWINGS

The invention is explained in more detail below with reference to the drawings in which:

FIG. 1 shows a diagrammatic sectional view of a first embodiment of an arrangement for damping a pulsation, and FIG. 2 shows a diagrammatic sectional view of another embodiment.

DESCRIPTION OF THE PREFERRED EMBODIMENT

FIG. 1 shows a diagrammatic longitudinal sectional viewthrough an apparatus 10 for damping a pulsation of a fluid conveyed therethrough from a conveying device 12 to a receptacle 16. In this case, the fluid, for example a hydraulic or cooling fluid, is conveyed to a receptacle 16 by way of a conduit system 14 which may comprise pipes and/or hoses.

The apparatus 10 has a holder 18 which comprises a flexible element 20. The latter consists, for example, of plastic, preferably of an elastomer, and is designed as a hollow body, here as a cylindrical pipe. The flexible element 20 may be hydrogenated acrylonitride butadiene rubber (HNBR) or chlorosulphonated polyethylene rubber (SMR).

The flexible element 20 encloses a cavity 24, in which two tubulair elements 23, 25 are arranged. These may be formed, for example, from plastic. The wall of each of the tubular members 23, 25 may be solid; however, for some applications, the wall of at least one of the tubular elements 23, 25 may have holes 22, preferably running radially. A suitable choice of plastic material ensures that both the flexible element and the tubular elements 23, 25 are resistant to the fluid temperatures occurring during the operation of the conveying device 12 and to the fluid itself. One type of plastic which may be used for the tubular elements 23, 25 is polytetrafluor ethylene (PTFE).

The tubular elements 23, 25, which are preferably designed as straight small tubes, but can also be of curved or twisted design, are fixed to the holder 18 by means of a retaining device 28 and are connected to the conduit system 14. When the conveying device 12 is in operation, the fluid to be conveyed enters the cavity 24 at an inflow orifice 30 of the first tubular element 23. A second tubular element 25 has an outflow orifice 32, by way of which the fluid passes out of the cavity 24 and, by way of the conduit system 14, to the receptacle 16. The cavity 24 is filled with the fluid to be conveyed.

The conveying device 12 is, for example, a displacement pump which, while in operation, transmits pulsations to the fluid. The pulsations cause pressure fluctuations in the fluid. Pulsation waves therefore run through the fluid conveyed. As a result of such pulsation waves, excess pressure occurs in the cavity 24, so that the flexible element 20 is deflected or widened radially outwards. After the pulsation wave and the excess pressure caused by the latter have disappeared, the flexible element 20 contracts radially inwards. The energy necessary for the expansion of the flexible element 20 is abstracted from the pulsation, so that the latter is damped.

It is shown, furthermore, that the pulsation in the conduit system downstream of the arrangement, as seen in the direction of flow, can advantageously be influenced by the length A, B of the respective tubular elements 23, 25 and the length C of the cavity 24 in the flexible element 20. In this case, the length A, B of each of the individual tubular elements 23, 25 is smaller than the length C of the cavity 24 of the cavity of the flexible element 20. In total, however, the length (A+B) of the two tubular elements 23, 25 exceeds the length C of the flexible element 20. The two tubular elements 23, 25 are therefore arranged next to one another in an overlap region within the cavity 24. The length L of the overlap region is determined according to the formula L=(A+B)−C. The inflow orifice 30 of tubular element 23 is therefore offset relative to the outflow orifice 32 of tubular element 25 by the length L. Thus, starting from the inflow orifice 30, the fluid, on its way to the outflow orifice 32, is conveyed, within the cavity 24 in the flexible element 20, in opposite direction to the conveying direction or direction of flow prevailing in the conduit system 14 and in the tubular elements 23, 25. The distance which the pressure waves must cover within the flexible element 20 is thereby increased. It is longer than the free distance C present in the cavity 24. It is shown, in this case, that the pulsation can be damped in a surprisingly simple way by means of the apparatus 10.

Pulsation damping may be influenced by varying the length A, B of the tubular elements 23, 25, in particular the sum of the lengths (A+B), the length C of the cavity 24 of flexible element 20 and the length L of the overlap region. By means of the measures described here, the resonant frequencies can be influenced and displaced, specifically in such a way that the frequencies which then still occur no longer have such a great effect, or even have virtually no effect at all, on noise and on vibrations. In all the components which are downstream of the apparatus 10 in the direction of flow of the fluid, the pulsation is damped in this way, and consequently disturbing vibrations or noises are also reduced.

FIG. 2 shows a diagrammatic sectional view of another embodiment of apparatus 110. Here, the tubular elements 123, 125 have a wall produced from a metal spiral. The fluid may emerge under excess pressure in the regions 122 in which adjacent spiral flights are in each case adjacent to one another. Additional turbulence therefore occur on the outer surface of the tubular elements 123,125 and are conducive to pulsation damping. All the other components have the same functionality as the components of the exemplary embodiment according to FIG. 1. Identical parts are therefore given the same reference symbols. Reference is made, to that extent, to the description relating to FIG. 1.

It may also be pointed out, here, that a combination of small tubes made of plastic and metal is also possible. One of the tubular elements may therefore consist of plastic and the other of metal. It may also be envisaged to use small plastic or metal tubes with a perforated wall or small tubes with a wall consisting of a plastic spiral. By means of this perforation, too, the fluid can emerge through the wall transversely to the conveying direction and generate vortices in the cavity 24, so as to ensure additional damping of pulsations.

The apparatus 10, 110 can be used to damp pulsations of any fluids conveyed through a conveying device 12. It may therefore be employed both, and preferably, in the conveyance of liquid media and in the conveyance of gaseous media.

I claim:

1. Apparatus for damping a pulsation of a fluid conveyed through a fluid flow system comprising a housing defining a cavity, said housing including a flexible element adjacent said cavity, a first tubular element positioned in said cavity for receiving fluid, said first tubular element having an outlet end within said cavity, and a second tubular element positioned in said cavity for directing fluid out of said cavity, said second tubular element having an inlet end within said cavity positioned along side of said first tubular element, each of said tubular elements having a length less than the length of said cavity, the sum of the lengths of said tubular elements being greater than the length of the cavity, said tubular elements overlapping one another such that fluid flowing out of said outlet end of said first tubular element must flow in a generally reverse direction from the direction of flow within said first tubular element in order to reach said inlet end of said second tubular element.

2. Apparatus according to claim 1, wherein the flexible element is an elastomer.

3. Apparatus according to claim 1, wherein at least one of the tubular elements is plastic.

4. Apparatus according to claim 1 wherein at least one of said tubular elements has a wall with holes.

5. Apparatus according to claim 1 wherein at least one of said tubular elements has a wall formed from a metal spiral.

6. Apparatus according to claim 1 wherein said flexible element encircles said tubular elements, fluid flowing in said generally reverse direction contacting said flexible element.

7. Apparatus according to claim 1 wherein each of said tubular elements is fixed in the cavity by means of a retaining device, fluid flowing in said generally reverse direction contacting said flexible element.

8. Apparatus for damping a pulsation of a fluid flowing through a fluid flow system having fluid flow members comprising (a) a housing having (i) a cavity defined at least in part by a flexible wall, (ii) an inlet providing communication between one of said fluid flow members and said cavity and (iii) an outlet, spaced from said inlet, providing communication between said cavity and another of said fluid flow members;

(b) a first tubular member joined to said inlet and extending throughout a major portion of said cavity, said first tubular member having an outlet orifice within said cavity; and (c) a second tubular member joined to said outlet and extending throughout a major portion of said cavity, said second tubular member having an inlet orifice, each of said first and second tubular members having a length which is less than the length of said cavity, the sum of the lengths of said first and second tubular members being greater than the length of said cavity, said first tubular member and said second tubular member being disposed within said cavity in overlapping, side-by-side relationship such that fluid flowing out of said first tubular member outlet orifice must flow in a generally reverse direction from the direction of flow within said first tubular member in order to reach said inlet orifice of said second tubular member.

9. Apparatus according to claim 8 wherein at least one of said tubular members has radial holes.

10. Apparatus according to claim 8 wherein at least one of said tubular members has a wall formed from a metal spiral.

11. Apparatus for damping a pulsation of a fluid flowing through a fluid flow system having fluid flow members comprising (a) a housing extending along an axis, said housing having (i) a cavity defined at least in part by a flexible wall and axially spaced apart first and second ends, (ii) an inlet at said first end providing communication between one of said fluid flow members and said cavity and (iii) an outlet at said second end providing communication between said cavity and another of said fluid flow members;

(b) a first tubular member joined to said inlet and extending throughout a major portion of said cavity;

(c) a second tubular member joined to said outlet and extending throughout a major portion of said cavity;

each of said first and second tubular members having a length which is less than the distance between said first end and said second end, the sum of the lengths of said first and second tubular members being greater than the distance between said first end and said second end, at least one of said first and second tubular members having a length greater than one-half the distance between said first end and said second end, said first and second tubular members being disposed within said cavity in at least partially side-by-side overlapping relationship.

12. Apparatus according to claim 11 wherein at least one of said tubular members has radial holes.

13. Apparatus according to claim 11 wherein at least one of said tubular members has a wall formed from a metal spiral.

14. A method for damping pulsations of a fluid conveyed through a fluid flow system in a first direction comprising the steps of (a) directing fluid generally in said first direction into an expandable cavity extending from a first end to a second end, said fluid entering said cavity from a first tubular member positioned therein;

(b) causing said fluid to flow out of said first tubular member and thereafter in a second direction generally opposite to said first direction;

(c) thereafter causing said fluid to flow into a second tubular member positioned in said cavity in side-by-side overlapping relationship with said first tubular member generally in said first direction and out of said cavity; and (d) causing said cavity to expand and contract while said fluid is conveyed between said first tubular member and said second tubular member.

15. The method according to claim 14 further including the step of varying the extent to which said first and second tubular members overlap.

16. Apparatus according to claim 11 wherein at least one of said first tubular member or said second tubular member is disposed at an angle relative to said axis.

17. Apparatus according to claim 8 wherein said flexible element encircles said tubular elements, fluid flowing in said generally reverse direction contacting said flexible element.

18. Apparatus according to claim 11 wherein said flexible element encircles said tubular elements, fluid flowing in said generally reverse direction contacting said flexible element.

* * * * *